J. R. GAMMETER.
PNEUMATIC TIRE STRUCTURE.
APPLICATION FILED FEB. 8, 1918.

1,291,676.

Patented Jan. 14, 1919.

INVENTOR.
BY J. R. Gammeter
Robert McPierson
ATTORNEY

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

PNEUMATIC-TIRE STRUCTURE.

1,291,676.     Specification of Letters Patent.     Patented Jan. 14, 1919.

Application filed February 8, 1918. Serial No. 215,963.

*To all whom it may concern:*

Be it known that I, JOHN R. GAMMETER, a citizen of the United States, residing at Akron, in the county of Summit and State of Ohio, have invented certain new and useful Improvements in Pneumatic-Tire Structures, of which the following is a specification.

This invention relates to pneumatic tire structures for vehicle wheels, and its object is to provide improved means for reducing wind resistance and protecting the spokes or equivalent part of the wheel. This is an important consideration with reference to the landing wheels of air-planes, especially as regards wind resistance.

Of the accompanying drawings.

Figures 1, 2, 3:
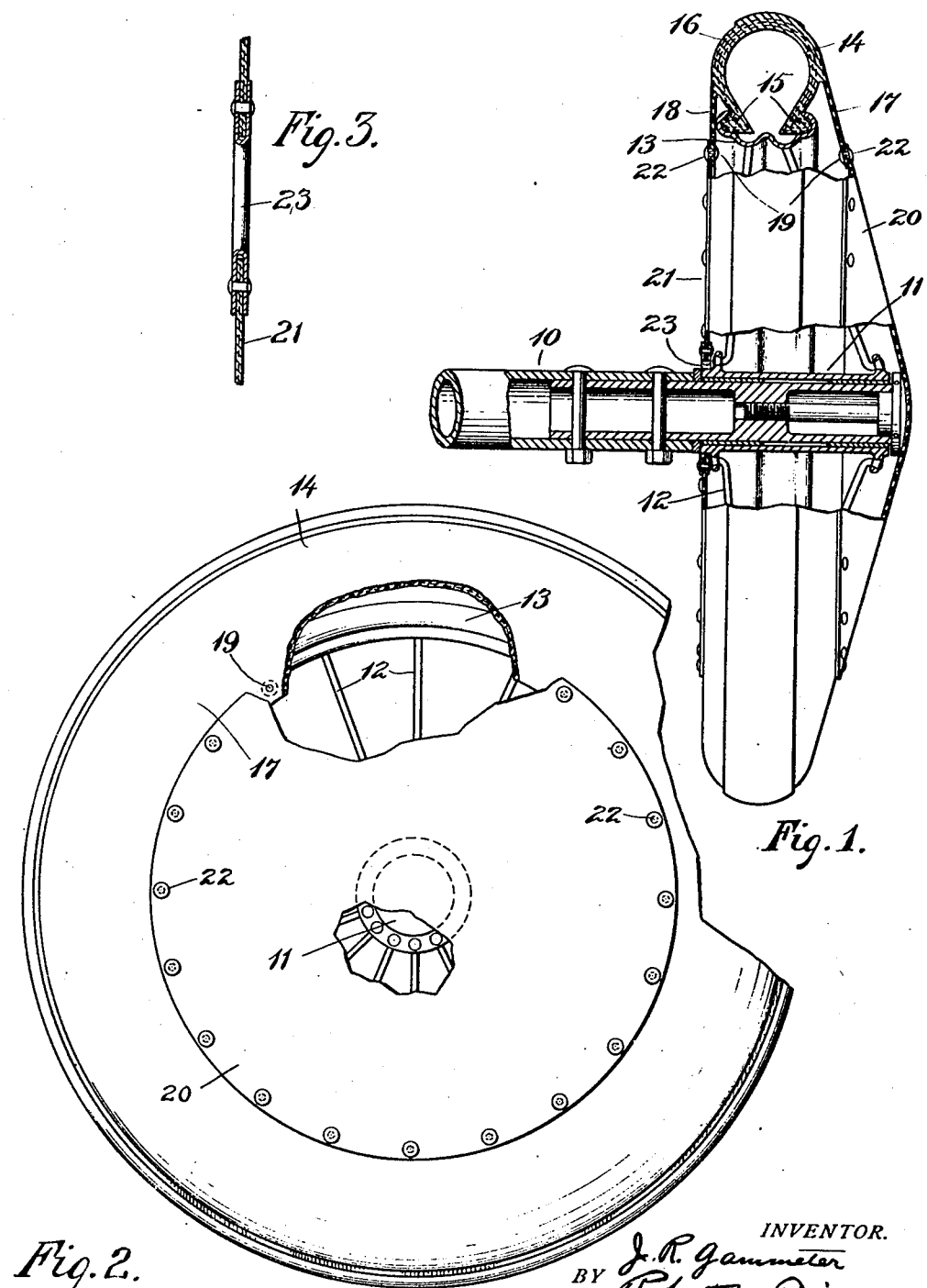
Figure 1 is an edge view, partly in section, showing a pneumatic-tired wheel provided with my improvement.
Fig. 2 is a side elevation, partly broken away.
Fig. 3 is a detail section showing the central aperture in the inner cover disk.

It has heretofore been proposed to cover the sides of the wheel with flexible disks or sheets of rubberized cloth detachably connected with the pneumatic tire by means of fasteners having members mounted directly upon the side walls of the tire casing, but this arrangement is objectionable in some respects, particularly owing to the difficulty of properly securing the fastener members to the casing, and the further fact that they interfere with the smoothness of the tire sides and permit the entrance of foreign matter under the edges of the disks in traveling through comparatively shallow mud or water.

My invention overcomes these objections by providing the sides of the tire casing with integral flaps or skirts to which the disks are attached.

In the drawings, I have shown a wheel having axle 10, hub 11, spokes 12 and rim 13. 14 is a pneumatic tire casing having rim-engaging beads 15, the inner air-tube being omitted from the illustration. An outer ply 16, composed of one or more layers of the ordinary woven, cord or other rubberized carcass fabric incorporated in the tread wall, is extended at both sides to form skirts or flaps 17, 18 whose margins are provided with members 19 of snap fasteners.

20, 21 are flexible disks or webs of rubberized fabric having on their edges complemental snap-fastener members 22 whereby they are detachably connected with the flaps 17, 18. These disks form covers for both sides of the wheel, or the space embraced by the annular tire, and they serve to reduce the wind resistance and protect the spokes and other wheel structure. The outer disk 20 is continuous over the end of the wheel hub 11 and the inner disk 21 has a reinforced central aperture 23 for the passage of the wheel axle 10. The tire ply 16, with its flaps 17, 18, provides a smooth exterior of considerable radial depth, and the removal of the fastener members from the side wall of the tire allows them to be more securely mounted and better distributes the strains between tire and side-covers than the prior arrangement referred to.

I claim:

1. In combination, a vehicle wheel, a pneumatic tire thereon having a flap, and a side cover for the wheel detachably connected with said flap.

2. A pneumatic tire having an integral flap, and a circular flexible side web connected with said flap and covering the space embraced by said tire.

3. A pneumatic tire casing having rim-beads, an annular flap integrally connected by its outer margin with one side of said casing, between the tread and one of the rim-beads, and fastener members on the inner margin of said flap.

4. In combination, a vehicle wheel, a pneumatic tire thereon having flaps on both sides, and side covers for the wheel detachably connected with the respective flaps.

5. In combination, a vehicle wheel, a pneumatic tire thereon having a rubberized fabric ply forming an integral part of its tread wall and extended as an annular flap at the side, and a side cover for the wheel detachably connected with said flap.

6. In combination, a vehicle wheel having a rim and hub, a pneumatic tire casing having beads engaging the rim, said casing being integrally formed with a tread and sidewall ply of rubberized fabric extended at both sides to form annular flaps, fastener members on the inner margins of said flaps, and flexible covers for both sides of the wheel having complemental fastener members detachably connected with those on the flaps, one of said covers being centrally apertured for the passage of the wheel axle.

In testimony whereof I have hereunto set my hand this 4 day of February 1918.

JOHN R. GAMMETER.